United States Patent
Chen et al.

(10) Patent No.: US 11,237,825 B2
(45) Date of Patent: Feb. 1, 2022

(54) REFINING A SOFTWARE SYSTEM USING LIVE DOCUMENTATION MAPPING

(71) Applicant: International Business Machines Corporation, Armonk, NY (US)

(72) Inventors: Jim Chun-Ta Chen, Rochester, MN (US); Mariah Nordlund, Rochester, MN (US); Leah Temple, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/288,897

(22) Filed: Feb. 28, 2019

(65) Prior Publication Data

US 2020/0278861 A1    Sep. 3, 2020

(51) Int. Cl.
*G06F 8/73* (2018.01)
*G06F 9/451* (2018.01)

(52) U.S. Cl.
CPC .............. *G06F 8/73* (2013.01); *G06F 9/453* (2018.02)

(58) Field of Classification Search
None
See application file for complete search history.

(56) References Cited

U.S. PATENT DOCUMENTS

| | | | | |
|---|---|---|---|---|
| 5,155,806 A | * | 10/1992 | Hoeber | G06F 9/453 715/711 |
| 5,361,361 A | * | 11/1994 | Hickman | G06F 9/453 715/705 |
| 5,535,323 A | * | 7/1996 | Miller | G06F 9/453 715/707 |
| 5,774,118 A | * | 6/1998 | Hatakama | G06F 9/453 715/707 |
| 6,307,544 B1 | * | 10/2001 | Harding | G06F 9/453 715/709 |
| 6,671,874 B1 | * | 12/2003 | Passova | G06F 8/73 714/E11.218 |
| 6,871,322 B2 | * | 3/2005 | Gusler | G06F 9/453 715/708 |
| 7,158,965 B1 | * | 1/2007 | Greenberg | G06F 9/453 |
| 7,661,142 B2 | | 2/2010 | Daos et al. | |
| 7,818,342 B2 | | 10/2010 | Stuhec | |

(Continued)

OTHER PUBLICATIONS

Amplitude, "Product Analytics for the Digital Era," 2018, 9 pages.

(Continued)

*Primary Examiner* — Matthew J Brophy
(74) *Attorney, Agent, or Firm* — Patterson + Sheridan, LLP

(57) ABSTRACT

Live documentation mapping is described which includes tracking executed actions in the software program by an end user, tracking the end user's interaction with technical documentation, and tracking the end users other communication about a product. The tracked information is mapped to a virtual living/updating technical documentation of the software program. The tracked executed actions and updated technical documentation are then aggregated for a total install base of users for a software program and used to generate system reports for the software program including directives on how the system should react from a development and/or business direction.

20 Claims, 7 Drawing Sheets

(56) References Cited

U.S. PATENT DOCUMENTS

| | | | | |
|---|---|---|---|---|
| 7,849,405 B1* | 12/2010 | Coletta | G06F 9/453 |
| | | | 715/708 |
| 7,886,227 B2* | 2/2011 | Aggarwal | G06F 9/453 |
| | | | 715/705 |
| 7,895,519 B1* | 2/2011 | Allegrezza | G06F 11/3438 |
| | | | 715/708 |
| 8,225,281 B1* | 7/2012 | Hardinger | G06F 8/70 |
| | | | 717/120 |
| 8,938,717 B1* | 1/2015 | Subramanian | G06F 8/658 |
| | | | 717/123 |
| 8,996,471 B2* | 3/2015 | Greenberg | G06F 9/453 |
| | | | 707/687 |
| 9,069,580 B2* | 6/2015 | Armstrong | G06F 9/453 |
| 9,122,496 B1* | 9/2015 | Jhoney | G06F 8/73 |
| 9,141,342 B2* | 9/2015 | Baumann | G06F 8/30 |
| 9,389,882 B2* | 7/2016 | Armstrong | G06F 9/453 |
| 9,588,871 B1* | 3/2017 | Estes, Jr. | G06F 8/73 |
| 9,954,746 B2* | 4/2018 | Kashtan | H04L 43/06 |
| 10,127,204 B2* | 11/2018 | Lantwin | G06F 40/151 |
| 10,133,568 B2* | 11/2018 | He | G06F 11/3636 |
| 10,146,558 B2* | 12/2018 | Armstrong | G06F 3/04842 |
| 10,223,137 B2* | 3/2019 | Brew | G06F 9/453 |
| 10,241,809 B2* | 3/2019 | Gopalakrishnan | G06F 9/453 |
| 2003/0043179 A1* | 3/2003 | Gusler | G06F 9/453 |
| | | | 715/708 |
| 2003/0043180 A1* | 3/2003 | Gusler | G06F 9/453 |
| | | | 715/708 |
| 2003/0046410 A1* | 3/2003 | Gusler | G06F 9/453 |
| | | | 709/229 |
| 2005/0266866 A1* | 12/2005 | Ahya | G06F 9/453 |
| | | | 455/502 |
| 2006/0161511 A1 | 7/2006 | Berstis et al. | |
| 2009/0183237 A1* | 7/2009 | Cortes | G06F 9/453 |
| | | | 726/4 |
| 2012/0137212 A1* | 5/2012 | Baumann | G06F 8/30 |
| | | | 715/239 |
| 2012/0159442 A1* | 6/2012 | Dearman | G06F 8/73 |
| | | | 717/123 |
| 2014/0181652 A1* | 6/2014 | Stanke | G06F 9/453 |
| | | | 715/708 |
| 2014/0282178 A1* | 9/2014 | Borzello | G06F 3/0484 |
| | | | 715/771 |
| 2015/0254083 A1* | 9/2015 | Armstrong | G06F 3/04842 |
| | | | 715/707 |
| 2016/0088101 A1 | 3/2016 | Batiste et al. | |
| 2016/0283253 A1* | 9/2016 | Armstrong | H04L 67/22 |
| 2017/0012838 A1* | 1/2017 | Kashtan | H04L 41/0273 |
| 2017/0060577 A1* | 3/2017 | Schreiber | G06F 16/93 |
| 2017/0300482 A1* | 10/2017 | Gopalakrishnan | G06F 9/453 |
| 2018/0060067 A1* | 3/2018 | He | G06F 11/3612 |
| 2018/0239601 A1* | 8/2018 | Richstein | G06Q 10/06311 |
| 2019/0073232 A1* | 3/2019 | Armstrong | H04L 67/22 |
| 2019/0196949 A1* | 6/2019 | Venkataraman | G06F 11/3684 |
| 2020/0183681 A1* | 6/2020 | Ramsl | G06F 9/453 |

OTHER PUBLICATIONS

Https://www.gigatrak.com/software/document-tracking-system/ "Document Tracking System," [Accessed Online Oct. 22, 2018].
Https://www.comindware.com/document-tracking-software/ [Accessed Online Oct. 22, 2018].

* cited by examiner

REFINING A SOFTWARE SYSTEM USING LIVE DOCUMENTATION MAPPING

BACKGROUND

The present disclosure relates to live documentation mapping and software program execution tracking, and more specifically, to marking and updating central tracking information for a software program system. Current implementations of software usage and technical documentation tracking lack granular detail in the actual execution and usage of software programs and corresponding technical information that is consulted, read, and/or absorbed by a user during runtime of the software.

SUMMARY

According to one embodiment of the present invention, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: generating a central documentation framework mapping one or more technical documentation sections of a software program to one or more tags in an architecture of the software program; initializing a tag execution tracking log; providing the software program to one or more users; marking the central documentation framework with user interaction information received from one or more user management systems associated with the one or more users; updating the tag execution tracking log with user execution information received from the one or more user management systems associated with one or more users; generating, using the tag execution tracking log and the central documentation framework mapping, a diagnostic report including one or more absorbed technical documentation sections and one or more user executed tags in the architecture of the software program; and generating one or more system reports comprising one or more system development directives for altering the software program based on the diagnostic report. Other embodiments of this aspect include corresponding computer systems, apparatus, and computer programs recorded on one or more computer storage devices, each configured to perform the actions of the methods.

For example, one embodiment includes a central management system. The central management system includes one or more processors; and a memory containing a program which when executed by the processors performs an operation including: generating a central documentation framework mapping one or more technical documentation sections of a software program to one or more tags in an architecture of the software program; initializing a tag execution tracking log; providing the software program to one or more users; marking the central documentation framework with user interaction information received from one or more user management systems associated with the one or more users; updating the tag execution tracking log with user execution information received from the one or more user management systems associated with one or more users; generating, using the tag execution tracking log and the central documentation framework mapping, a diagnostic report including one or more absorbed technical documentation sections and one or more user executed tags in the architecture of the software program; and generating one or more system reports comprising one or more system development directives for altering the software program based on the diagnostic report. Other embodiments of this aspect include corresponding computer systems, apparatus, and computer programs recorded on one or more computer storage devices, each configured to perform the actions of the methods.

In another example embodiment, a user management system is provided. The user management system including: one or more processors; and a memory containing a program which when executed by the processors performs an operation. The operation including: receiving a local documentation framework mapping one or more technical documentation sections of a software program to one or more tags in an architecture of the software program from a central management system; initializing a local tag execution tracking log; during execution of the software program by one or more local users: updating the local tag execution log with an indication of one or more tags executed by the one or more local users; generating local user interaction information based on actions of the one or more local users; marking the local documentation framework with local user interaction; and providing the local tag execution log, the local user interaction information, and the local documentation framework to the central management system. Other embodiments of this aspect include corresponding computer systems, apparatus, and computer programs recorded on one or more computer storage devices, each configured to perform the actions of the methods.

DETAILED DESCRIPTION

In the software development industry, software programs and products require large amounts of human resources and effort to develop the programs, including the operative parts of the software programs, the necessary programming documentation for the software program architecture, and the technical documentation that is used alongside the software program during execution. In some cases, the large amount of effort and resources dedicated to the development of the software program is not evenly distributed among parts of the software program that become the main feature used by the users of the program and/or the more profitable parts of the program.

For example, software developers may devote a large amount of development time and resources to Feature A of a software program, but during the execution of the software program by users, Feature B is more heavily used by users. During the maintenance and further development of the software program it often takes long periods of time and large amounts of persistent user feedback and tracking to effectively identify which features are being utilized in runtime of the software.

Additionally, software developers often lack insight into why one feature is utilized more often than another. For example, Feature A may be hard to access or understand from the user perspective, leading users to underutilize Feature A or utilize an alternate Feature B. Learning which features and functions of a software program are utilized by users and which features and functions often cause users to turn to technical documentation and/or outside help greatly increases software developers ability to adjust/update the software program according to the findings, as well as to monetize and license different aspects of the software program based on user behavior.

The systems and methods described herein provide for live documentation mapping which includes tracking executed actions in the software program by an end user, tracking the end user's interaction with technical documentation, and tracking the end users other communication about a product. The tracked information is mapped to a virtual living/updating technical documentation of the product. The tracked executed actions and updated technical documentation are then aggregated for a total install base of users for a software program and used to generate system reports for the software program including directives on how the system should react from a development and/or business direction.

Figure 1:
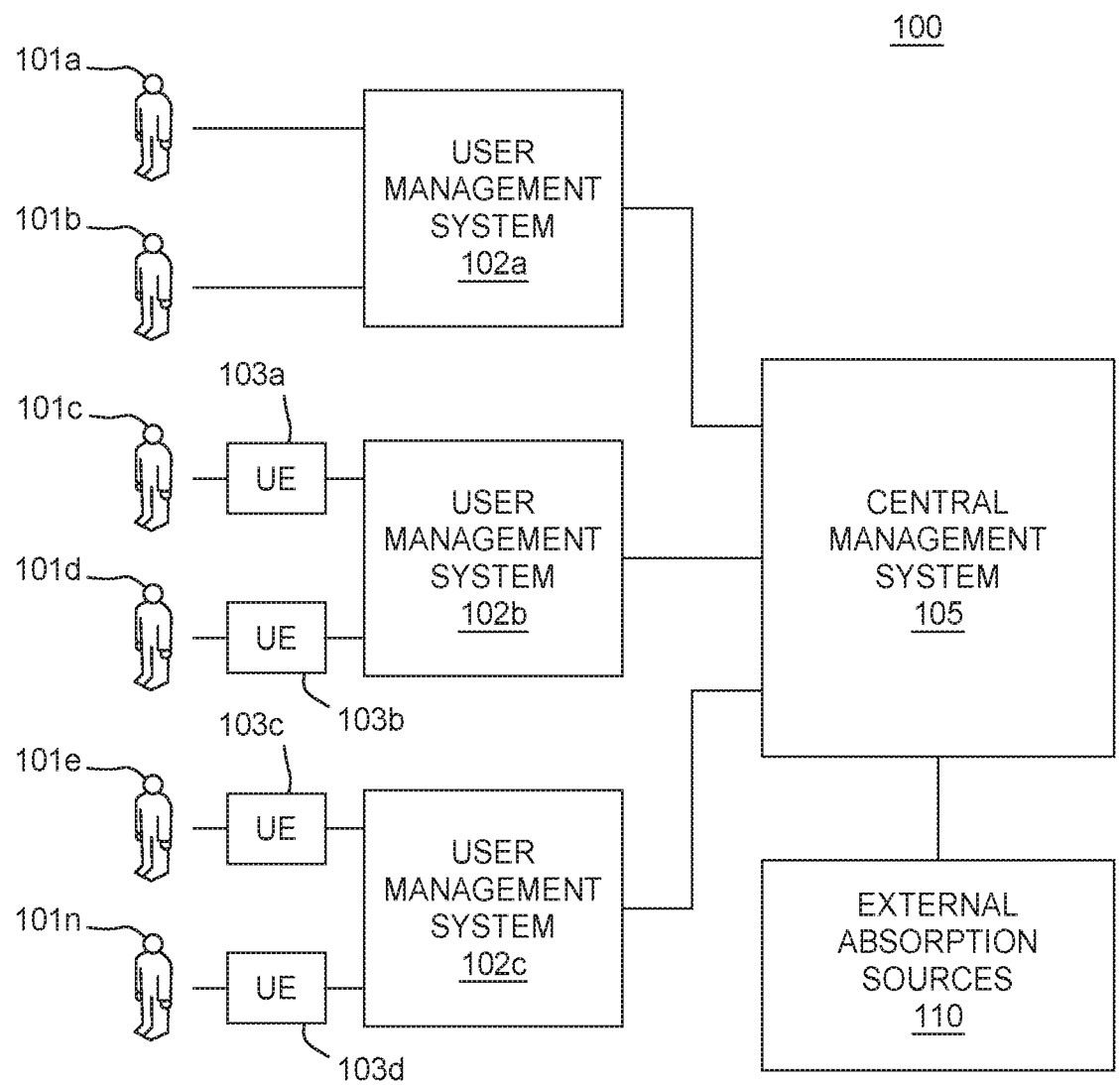
FIG. 1 illustrates a system for live documentation mapping, according to one embodiment described herein.

FIG. 1 illustrates a system 100 for live documentation mapping, according to one embodiment described herein. The system 100 includes a central management system 105 in communication with one or more user management systems 102a-c. The functions and processes of the central management system 105 and user management systems 102a-c are described in more detail in relation to FIG. 2. In some examples, such as during the development of a software program, the central management system 105 generates a central documentation framework for the software program and provides the software program to the one or more user management systems 102a-b for execution of the software.

The user management systems 102a-c execute local and/or user management specific versions of the software program and provide the functions of the software program to one or more users of a total user install base, such as users 101a-101n. In some examples, the user management systems 102a-c are systems in direct communication with a user. For example, the user management system 102a executes on a personal computer or user equipment executing the software program and other functions of the system 100 described herein. As shown, the users 101a and 101b directly communicate and/or interact with the user management system 102a. In some examples, the user management systems 102a-102c include a server and or enterprise level system that executes the software programs and/or provides access to the software program to one or more users through individual user equipment (UE) such as computers, tablets, mobile devices, etc. For example, the user management systems 102b and 102c include enterprise level servers/systems executing the software program and other functions of the system 100. The users 101c-101n interact with the user management systems 102b and 102c through UEs 103a-103d.

Figure 2:
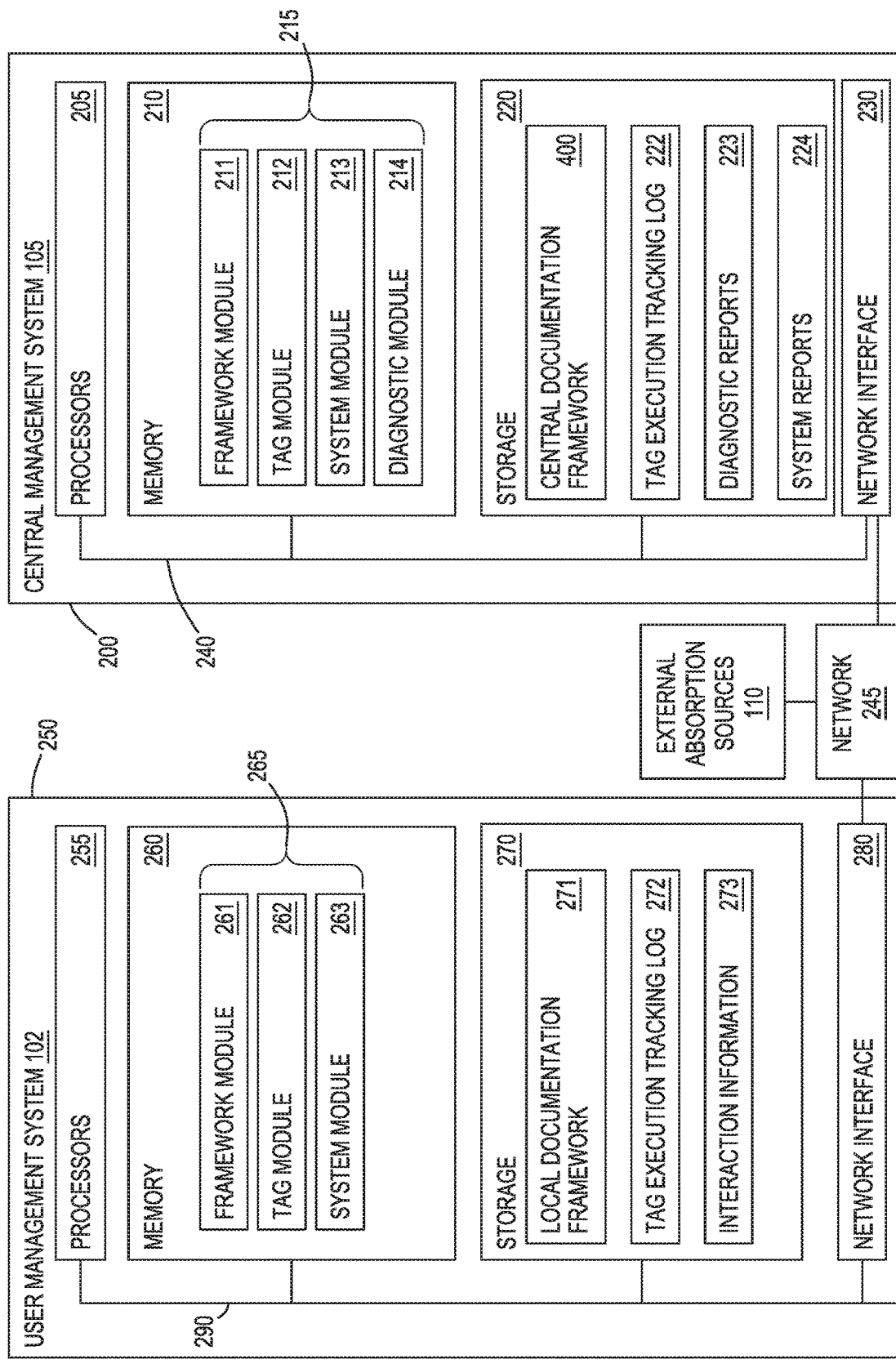
FIG. 2 is a block diagram of a system for live documentation mapping, according to one embodiment described herein.

As also shown in FIG. 1, the central management system 105 is also in communication with one or more external absorption sources 110, as described in further detail in relation to FIG. 2.

FIG. 2 is a block diagram of a system for live documentation mapping, according to one embodiment described herein. As shown, the arrangements 200 and 250 include servers embodied as central management system 105 and a user management system 102, respectively. The user management system 102 is deployed as any of the user management systems 102a-c. The arrangements 200 and 250 are configured to perform the methods described herein. The central management system 105 and user management system 102 are shown in the form of general-purpose computing devices. The components of the central management system 105 may include, but are not limited to, one or more processing units or processors 205, a system memory 210, a storage system 220, a network interface 230, and a bus 240 that couples various system components including the system memory 210 and storage system 220 to processors 205 along with the network interface 230, the network 245 via the network interface 230, and various input/output components. Similarly, the components of the user management system 102 may include, but are not limited to, one or more processing units or processors 255, a system memory 260, a storage system 270, a network interface 280, and a bus 290 that couples various system components including the system memory 260 and storage system 270 to processors 255 along with the network interface 280, the network 245 via the network interface 280, and various input/output components including the UEs 103a-n. In some embodiments, arrangements 200 and 250 are distributed and include a plurality of discrete computing devices that are connected through wired and/or wireless networking.

System memory 210, of the central management system 105 includes a plurality of program modules, such as modules 215 for performing various functions related to live documentation mapping described herein. The modules 215 generally include program code that is executable by one or more of the processors 205. As shown, modules 215 include framework module 211, tag module 212, system module 213, and diagnostic module 214. The modules 215 may also interact with each other and storage system 220 to perform certain functions as described herein and in greater detail in relation to FIGS. 5-9.

System memory 260 also includes a plurality of program modules such as modules 265 for performing various functions related to network performance assessment described herein. The modules 265 generally include program code that is executable by one or more of the processors 255. As shown, modules 265 include framework module 261, tag module 262, and system module 263. The modules 265 may also interact with each other and storage system 270 to perform certain functions as described herein and in greater detail in relation to FIGS. 5-9.

Figure 3:
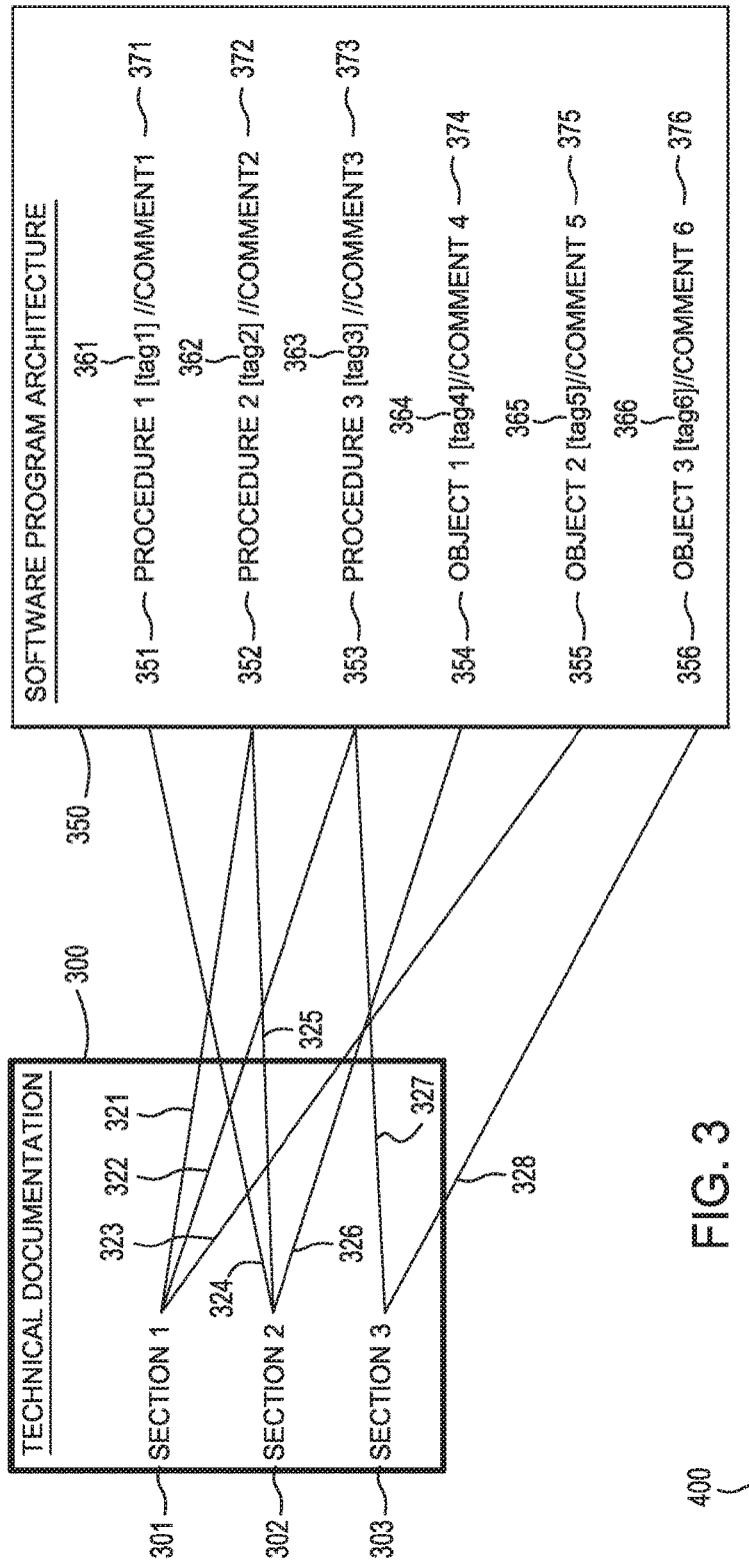
FIG. 3 is an example mapping of technical documentation to tags in a software program, according to one embodiment described herein.

FIG. 3 is an example mapping of technical documentation to tags in a software program, according to one embodiment described herein. In some examples, the framework module 211 of the central management system 105 generates a central documentation framework such as, central documentation framework 400 described in relation to FIG. 4. The framework module 211 generates the central documentation framework 400 by mapping various sections of the technical documentation 300 with related sections of the software program architecture 350. In some examples, the technical sections 301, 302, and 303 relate to various descriptive sections dealing with technical aspects and explanation of the software program. In some examples, the technical documentation 300 is accessible through a user interface that allows for a user to access the information in the technical documentation 300 using a user device such as UEs 103a-n.

The software program architecture 350 includes various functions, procedures, objects, etc. typical of a software program. For example, the software program architecture 350 includes the procedures 351-353 and objects 354-356. As shown the procedures 351-353 and objects 354-356 are associated with respective tags, such as tags 361-366 related to the various associated procedures and objects of the software program architecture 350. In some examples, the tags 361-366 are tags manually applied by a software developer. For example, the software developer embeds the tag 361 with procedure 351 to identify the type/function of the procedure 351. In some examples, the tags 361-366 are generated based on the procedures, the objects, and/or the various associated comments 371-376 and metadata in the software program architecture 350. For example, the tag 363 is generated based on the contents of the associated comment 373.

As shown, the framework module 211 generates the central documentation framework 400 using the mapping links 321-328 which map the technical sections 301-303 to the tags 361-366 and in turn the associated functions, procedure, and objects of the software program architecture 350. For example, technical section 302 is linked to the procedure 351 by the mapping link 324 to the tag 361. The mapping links 321-328 are used to generate the central documentation framework 400 shown in FIG. 4. For example, the framework section 401 includes the link between technical section 301 of the technical documentation 300 and procedure 352/tag 362, procedure 353/tag 363, and object 355/tag 365. In some examples, the framework sections also include a mapping to licensing, billing, and business directive information for the software program as shown in additional framework sections 410-412. In some examples, the mapping to licensing, billing, and business directive information includes relationship pairing similar to the mapping links shown in FIG. 3. In this example, the mapped relationship/link is between the technical documentation 300 and a Business Directive Knowledge Base. The knowledge base contains line item numbers, business requirements, licensing information and business directive definitions. The information is mapped similarly using text correspondence and/or other metadata. In some examples, the central documentation framework 400 is routinely updated and maintained as a live central documentation framework such as described in relation to FIGS. 5-9.

Figure 4:
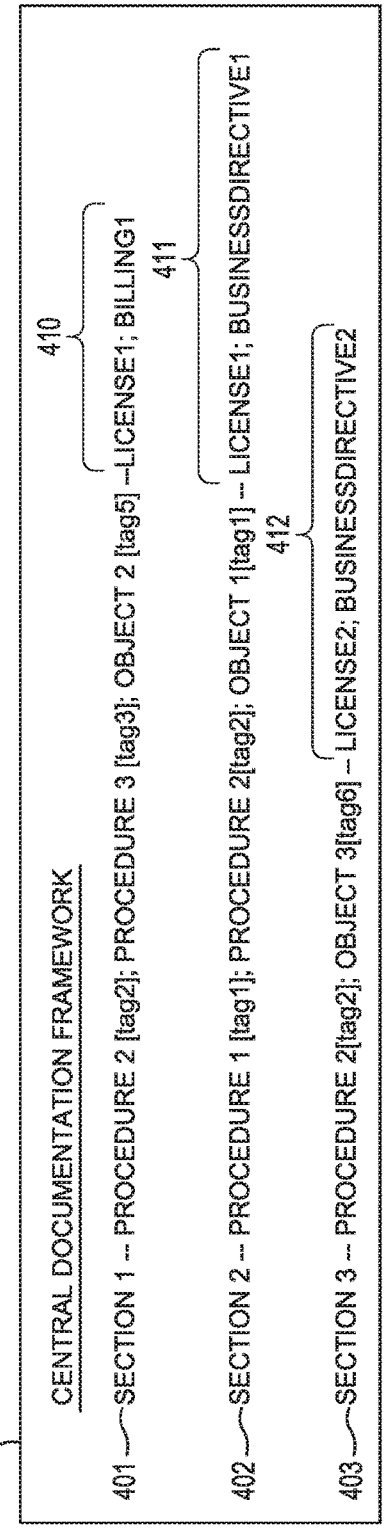
FIG. 4 is an example documentation framework, according to one embodiment described herein.
Figure 5:
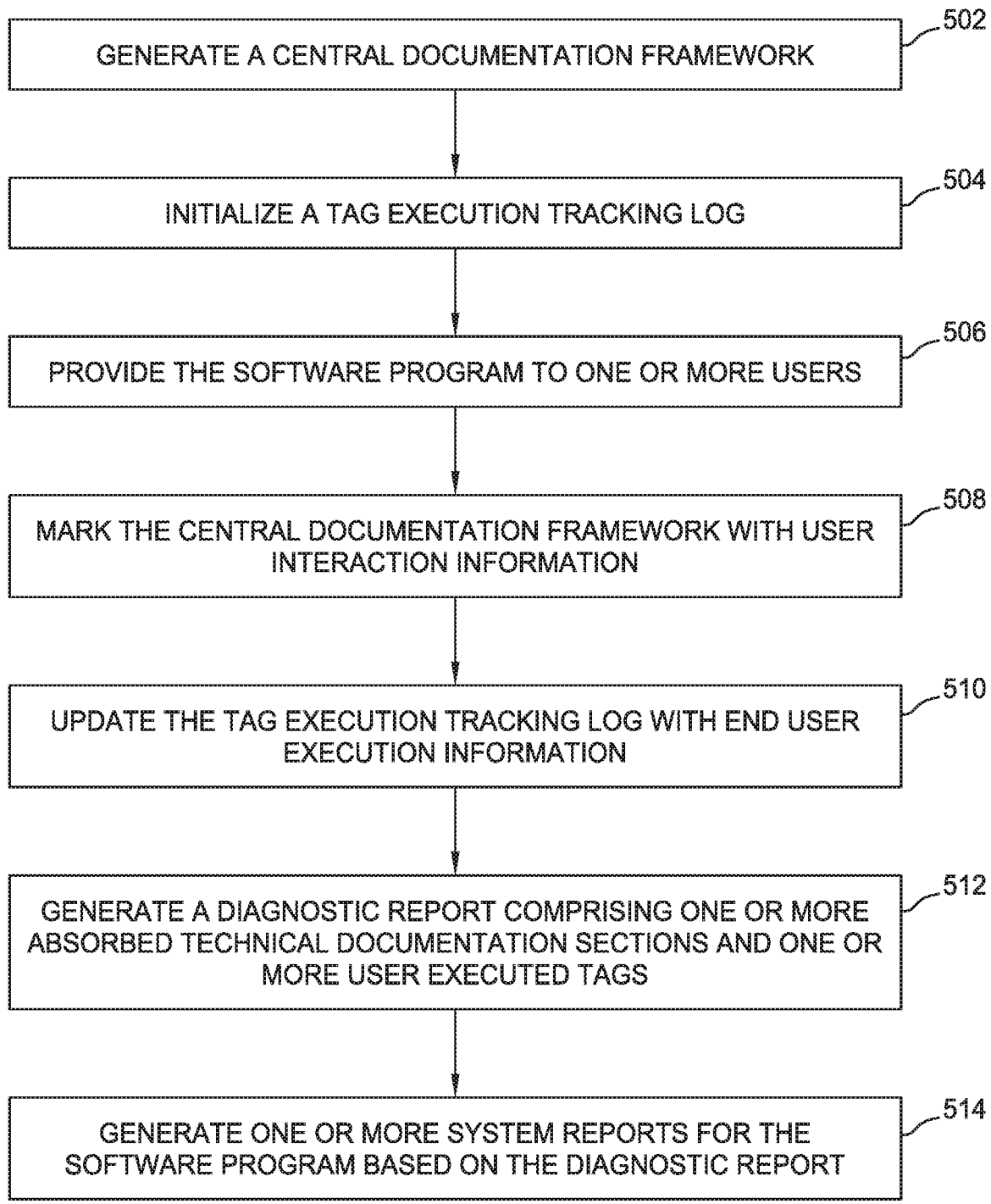
FIG. 5 is a method for live documentation mapping, according to one embodiment described herein.

FIG. 5 is a method for live documentation mapping at a central management system, according to one embodiment described herein. Method 500 begins at block 502 where a central management system, such as the central management system 105, including the framework module 211, generates a central documentation framework mapping one or more technical documentation sections of a software program to one or more tags in an architecture of the software program. For example, the framework module 211 generates the central documentation framework 400 as shown in FIG. 4. The central documentation framework 400 maps the technical sections 301-303 to the tags associated with the functions of the software program architecture 350. In some examples, the one or more tags are tags at procedure level such as tags 361-363. In some examples, the one or more tags include tags at an object level, such as the tags 364-365 in the architecture of the software program architecture 350.

In some examples, the one or more tags are embedded by the software developers in the architecture of the software program. In other examples, they are generated and embedded by the framework module into the software program architecture. In some examples, these generated tags are generated based on keywords in tracing output and/or comments in the software program architecture 350, such as the associated comments 371-376. In some examples, the central documentation framework 400 also maps licensing information for the software program, billing information for the software program, and business directive information for the software program (e.g., additional framework sections 410-412) to the various technical sections and mapped tags. For example, once generated, the framework section 401 includes the link between technical section 301 of the technical documentation 300 and procedure 352/tag 362, procedure 353/tag 363, and object 355/tag 365 as well as additional framework section 401 including licensing and billing information.

At block 504, the tag module 212 initializes a tag execution tracking log. For example, the tag module 212 initializes the tag execution tracking log 222. The tag execution tracking log 222 provides insight into which functions (e.g., procedures, objects, etc.) of the software program are accessed/executed by the user base.

At block 506, the system module 213 provides the software program to one or more users. For example, the system module 213 provides the software program to the user management systems 102a-c embodied as the user management system 102 in FIG. 2. In some examples, the provided software program includes the technical documentation 300, the software program architecture 350, and the generated central documentation framework 400 to be stored as a local documentation framework 271. In an initialization/setup phase, the system module 213 provides the entire software program for install of the various aspects of the software program. In some examples, during a maintenance and update development phase of the software program, the system module provides the software program as an update to the existing software program on the user management system 102.

At block 508, the framework module 211 marks the central documentation framework with user interaction information received from one or more user management systems associated with the one or more users. In some examples and as described in more detail in relation to FIGS. 8-9, the user management system 102 locally tracks the parts of the technical documentation sections the user absorbs and the parts of the software program executed by the users. For example, as a user reads a technical documentation section, the user management system 102 and/or the UE associated with the user may use eye tracking methods to determine what the user is reading and/or accessing in the technical documentation section. Additionally, when a user interacts with a technical documentation section by accessing the section, copying parts of the section text, following hyperlinks, etc., the user interaction information is tracked by the user management system 102 and provided to the central management system 105. In some examples, the technical documentation sections that are absorbed are marked by highlighting and/or tracking the number of times a user or users accesses the technical documentation section. For example, section 402 is highlighted by the framework module 211 when accessed by a user and include a tracking number for how many times users access the technical documentation section 302. In some examples, the highlighting of the absorbed or accessed framework sections allows for a developer to quickly view which sections have been absorbed. The central documentation framework 400 is also updated by additional user interaction information such as a user download indication when a user downloads the software program, a user registration indication when a user registers with the software program, and a user access indication when a user access the software program and/or various parts of the software program such as the "Help" section.

Additionally, in some examples, the central documentation framework also includes markings for external absorption sources 110 such as social media and/or customer support interactions. For example, the framework module 211 marks the central documentation framework tag execution tracking log with one or more external absorption sections received from one or more external absorption sources 110. For example, when a user seeks help from customer service agents for the software programs and/or external resources such as social resources (e.g., chat forums) related to the software program, the related technical sections and tags discussed is tracked and used to update the central documentation framework with further interaction information and/or absorption information.

At block 510, the tag module 212 updates the tag execution tracking log with user execution information received from the one or more user management systems associated with one or more users. For example, as a user accesses a function of the software program, the related tags of the procedures and objects that are executed in the software program by the user is tracked by the user management system 102. The tracked information is routinely and/or periodically provided to the central management system 105.

At block 512, the diagnostic module 214 generates, using the tag execution tracking log and the central documentation framework mapping, a diagnostic report 223 comprising one or more absorbed technical documentation sections and one or more user executed tags in the architecture of the software program. In some examples, the diagnostic reports include a summation of the marked information in the central documentation framework 400 and the tag execution tracking log 222. In some examples, the diagnostic reports are based on aggregate information for the total install base of users for the software program. In another example, the diagnostic model is generated for a single user and/or user management system to provide user or enterprise level diagnostics.

At block 514, the diagnostic module 214 generates one or more system reports 224 for the software program based on the diagnostic report. In some examples, the system reports include one or more system development directives for altering the software program according to one or more software development and/or business purposes based on the diagnostic report. For example, the system may include a bridge to an internal work management system of the software development enterprise (e.g., a software development company, etc.). In this example, the diagnostic module 214 further includes business rules that examine the aggregate live documentation mapping of the install base and analyzes the overall absorption of the user base.

The diagnostic module 214 also applies one or more defined rules in generating a ticket for an update to the software program architecture and/or technical documentation. For instance, if entire chapters of features are not being absorbed and/or executed by the install base, the diagnostic module 214 determines this outcome from the absorption of these sections of documentation. When the diagnostic module 214 analysis output reveals that these features are under-utilized in relation to the initial development investment, the system generates a work ticket for a marketing group to improve advertisement of these features.

In another example, the diagnostic module 214 detects high absorption or execution of sections of documentation linking to a specific feature and determines that this feature is currently not being charged to customers. The system generates a work ticket for a licensing and sales group to monetize this high usage feature. In another example, a section of documentation is found to be a pain point for customers and a work ticket is created for a development group to rework that function and/or code. Overall, these system reports are used by software program developers to determine which features and functions should be updated, monetized, removed etc., as described in greater detail in relation to FIG. 6.

Figure 6:
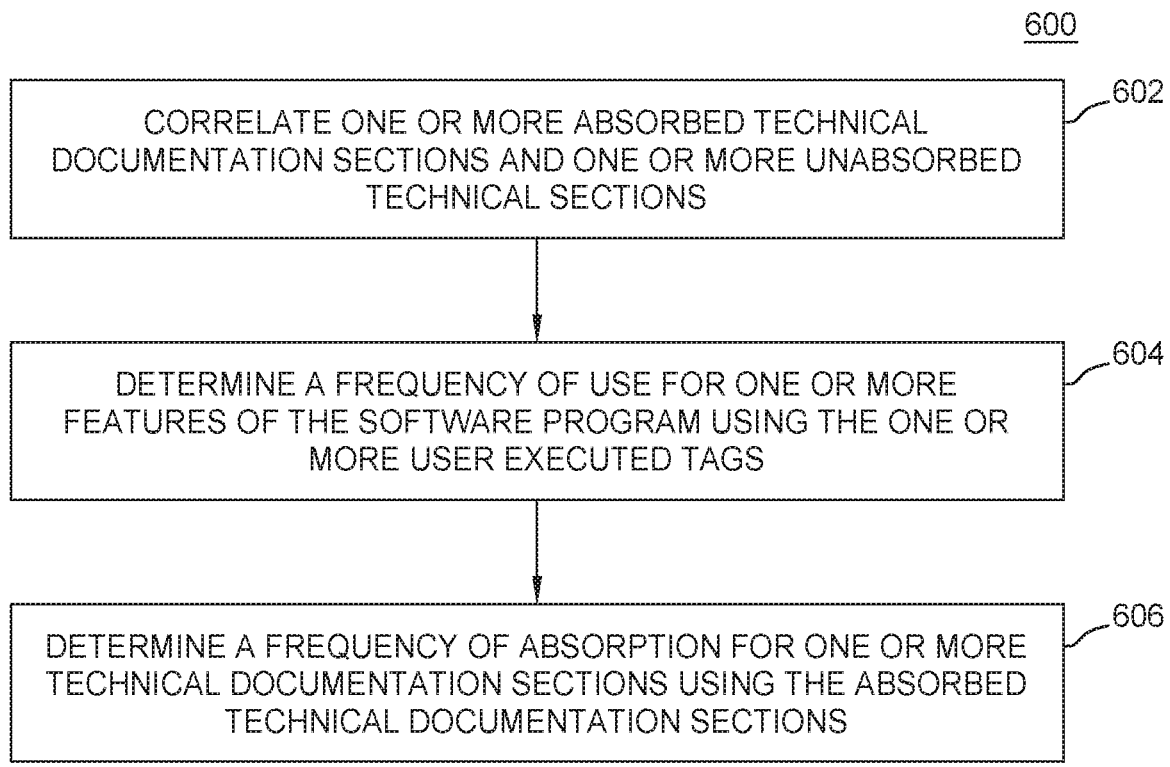
FIG. 6 is a method for generating one or more system reports, according to one embodiment described herein.

FIG. 6 is a method for generating one or more system reports based on the diagnostic report generated in block 512 of FIG. 5, according to one embodiment described herein. Method 600 begins at block 602 where a central management system, such as the central management system 105, including the diagnostic module 214, correlates one or more absorbed technical documentation sections and one or more unabsorbed technical sections. This correlation can be used to determine if there are parts of the software program that are functioning without users seeking additional information and parts of the software program for which users routinely seek information. For example, if section 301 has a level of absorption as indicated by the marking of the framework section 401, then the system report indicates that the related procedures indicated by the mapped tags, such as procedure 352 and 353 updates to ease user interaction and use of the related functions of the software program.

At block 604, the diagnostic module 214 determines a frequency of use for one or more features of the software program using the one or more user executed tags. For example, the diagnostic module 214 determines a frequency of use for one or more features of the software program using the one or more user executed tags. In some examples, the system report indicates that the frequently used portions of the software program can be monetized or licensed by the software developer. Additionally, the system report indicates that the features need to be updated frequently to ensure that user experience levels are maintained.

At block 606, the diagnostic module 214 determines a frequency of absorption for one or more technical documentation sections using the absorbed technical documentation sections. For example, the diagnostic module 214 determines a frequency of how often the technical section 302 is accessed, read, and/or absorb by one or more users. The frequency of absorption can then be used to determine if one or more actions should be taken by the software developers.

Figure 7:
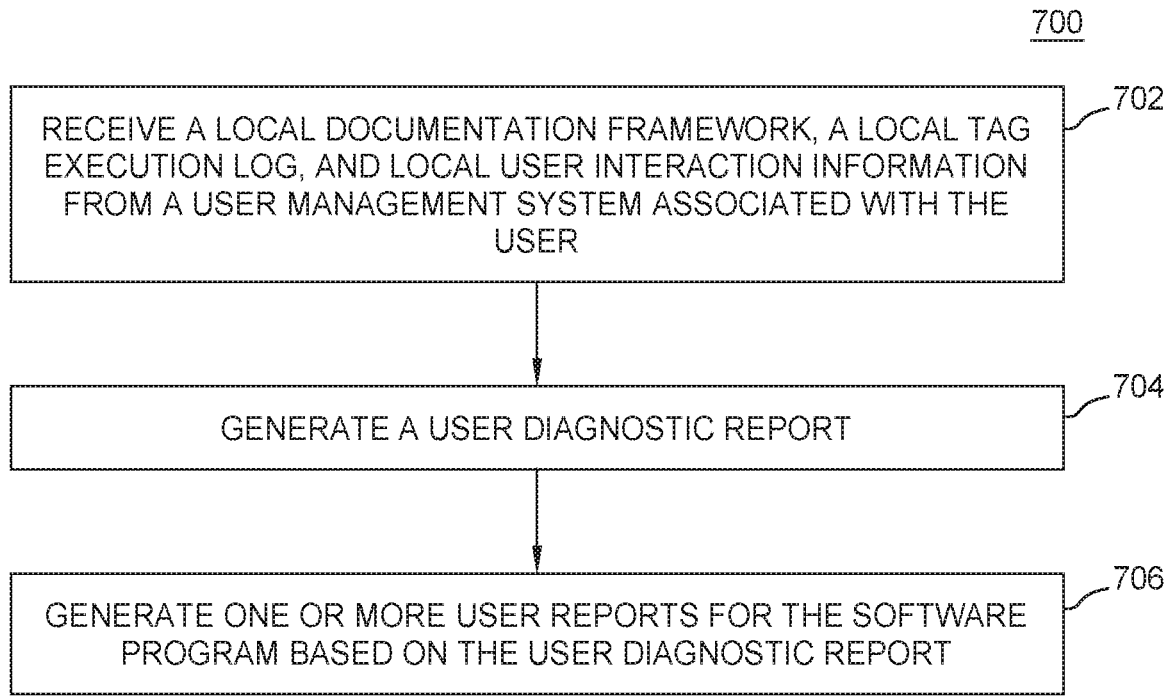
FIG. 7 is a method for generating user specific reports, according to one embodiment described herein.

FIG. 7 is a method for generating user specific reports, according to one embodiment described herein. Method 700 begins at block 702 where a central management system, such as the central management system 105, including the system module 213, receives a local documentation framework, a local tag execution log, and local user interaction information from a user management system associated with the user. In some examples, the information is received periodically from the user management system 102 during the execution of the software program. In another example, the central management system 104 requests the information, during a user/customer service session for the one or more users. For example, a customer service agent requests the local documentation framework 271, interaction information 273, and local tag execution log 272 from the user management system 102 in order to have recent tracking and mapping information.

At block 704, the diagnostic module 214 generates, using the local tag execution tracking log and the local documentation framework mapping, a user diagnostic report comprising one or more user specific absorbed technical documentation sections and one or more user specific user executed tags in the architecture of the software program. For example, the diagnostic module 214 determines a frequency of use for one or more features of the software program using the one or more user executed tags and which sections of the technical documentation that the user has accessed and/or absorbed. In some examples, this user diagnostic report is used by the customer service agent to determine one or more further actions that may be performed by the user and/or the system in order to aid a user in using the software program.

At block 706, the diagnostic module 214 generates one or more user reports for the software program based on the user diagnostic report. For example, based on the user diagnostic report, the diagnostic module produces reports that identify areas of the software program that the user is not utilizing and/or underutilizing. Additionally, the user reports help a customer service agent identify ways to help a user and/or improve user experience with the software program.

Figure 8:
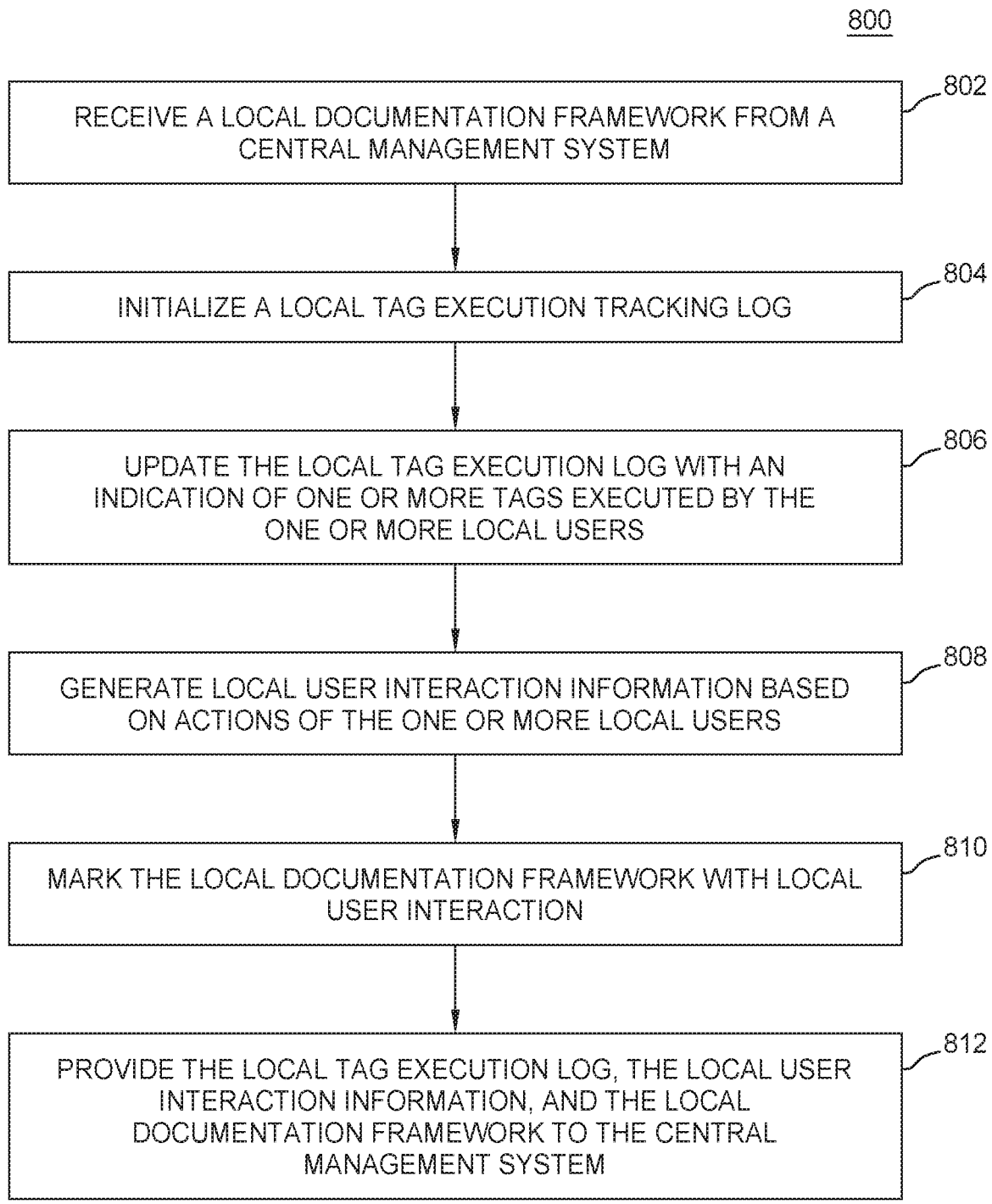
FIG. 8 is a method for live documentation mapping at a user management system, according to one embodiment described herein.

FIG. 8 is a method for local live documentation mapping at a user management system, according to one embodiment described herein. Method 800 begins at block 802 where a user management system, such as the user management system 102, including the system module 263, receives a local documentation framework 271 mapping one or more technical documentation sections of a software program to one or more tags in an architecture of the software program from a central management system. For example, when the user management system 102 receives/installs the software program the system module 263 saves a local version of the local documentation framework 271 in the storage system 270. The local version of the documentation framework is then used by the user management system 102 to track which parts of the technical documentation the user is accessing along with other interaction information 273.

At block 804, the tag module 262 initializes a local tag execution tracking log. For example, the tag module 262 initializes the local tag execution tracking log 272. The local version of the tag execution tacking log is used by the user management system 102 to determine which parts of the software program are accessed and executed by the user.

At block 806, the tag module 262, during the execution of the software program updates the local tag execution log with an indication of one or more tags executed by the one or more local users and at block 808 the framework module 261 generates local user interaction information based on actions of the one or more local users. For example, when a user interacts with the software program, such as a user download of the software program, starting the program, closing the program, etc. the system module 263 stores the information as interaction information 273. Other actions stored in the interaction information 273 include a user registration with the user management system, a user access of one or more sections of one or more technical documentation sections, and user absorption of one or more technical documentation sections.

At block 810, the framework module 261 marks the local documentation framework with local user interaction information, such as the interaction information 273. For example, the sections of the technical document accessed by the user will be marked in the local documentation framework 271. In some examples, the user management system utilizes systems, such as in UEs 103a-n to determine which parts of the technical documentation the user has read/absorbed and marks the local documentation framework based on the input from those sources. For example, a visual system associated with the user management system 102 determines that a user has read section 303 of the technical documentation 300. The framework module 261 updates a framework section 403 of the local documentation framework 271 based on the determination that the user has read the section 303. In another example, a user marking the one or more technical documentation sections as absorbed and/or a user interacting with the one or more technical documentation sections, such as copying the section and/or clicking through the section, indicates that the section has been absorbed by the user and will be marked by the framework module 261 as absorbed.

At block 812, the system module provides the local tag execution log, the local user interaction information, and the local documentation framework to the central management system. For example, the user management system 102 periodically sends the local tag execution log, the local user interaction information, and the local documentation framework to the central management system to the central management system 105 for aggregation and to aid in the generation of system reports for the software program.

Figure 9:
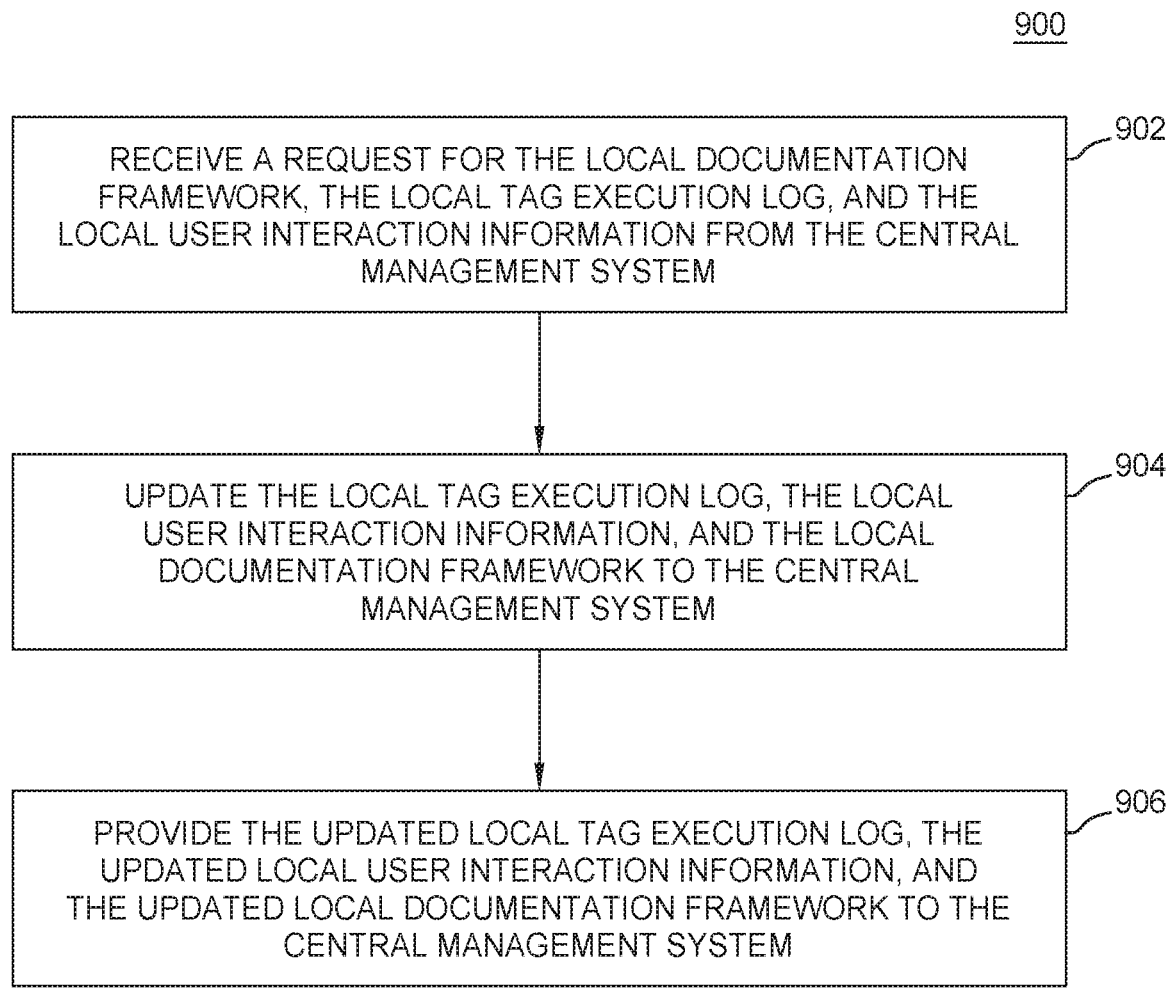
FIG. 9 method for providing information for user reports, according to one embodiment described herein.

FIG. 9 is a method for providing information for user reports, according to one embodiment described herein. Method 900 begins at block 902 where a user management system, such as the user management system 102, including the system module 263, receives a request for the local documentation framework, the local tag execution log, and the local user interaction information from the central management system. For example, during a user service session for a user, the user management system 102 receives a request for the updated local documentation framework, the local tag execution log, and the local user interaction information from the central management system 105.

At block 904, the system module, in response to the request, updates the local tag execution log, the local user interaction information, and the local documentation framework; and provides the updated local tag execution log, the updated local user interaction information, and the updated local documentation framework to the central management system at block 906. The updated information is then be used by the central management system 105 to generate user/system reports and/or diagnosis user problems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as the central management system 105 or related data available in the cloud. For example, the central management system 105 could execute on a computing system in the cloud and aggregate and generate diagnostic and system reports in the cloud topology. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
generating a central documentation framework mapping one or more technical documentation sections of a software program to one or more tags in an architecture of the software program;
initializing a tag execution tracking log;
providing the software program to one or more users;
marking the central documentation framework with user interaction information received from one or more user management systems associated with the one or more users;
updating the tag execution tracking log with user execution information received from the one or more user management systems associated with one or more users;
generating, using the tag execution tracking log and the central documentation framework, a diagnostic report comprising one or more absorbed technical documentation sections and one or more user executed tags in the architecture of the software program, wherein the one or more absorbed technical documentation sections comprise read technical documentation sections with which the one or more users have read determined by at least eye tracking methods tracking eyes of the one or more users to determine the read technical documentation sections; and
generating one or more system reports identifying at least a user utilization frequency of one or more software program features based on the diagnostic report and comprising one or more system development directives for altering the software program based on the diagnostic report and the user utilization frequency.

2. The method of claim 1, wherein the one or more tags comprise one or more of:
one or more tags at procedure level in the architecture of the software program; and
one or more tags at an object level in the architecture of the software program; and
wherein, the one or more tags comprise tags based on one or more of:
tags generated using keywords in a tracing output in the architecture of the software program; and
tags generated using keywords in comments in the architecture of the software program.

3. The method of claim 1, wherein central documentation framework mapping further comprises a mapping of one or more of:
licensing information for the software program;
billing information for the software program; and
business directive information for the software program.

4. The method of claim 1, wherein the user interaction information comprises one or more of:
a user download indication;
a user registration indication;
a user access indication; and
a user absorption indication; and
wherein the user execution information comprises:
an indication of one or more tags related to portions of the software program executed by the one or more users.

5. The method of claim 1, further comprising:
marking the central documentation framework with one or more external absorption sections received from one or more external absorption sources, wherein the one or more external absorption sources comprise:
customer support tracking logs; and
social resource tracking logs.

6. The method of claim 1, wherein generating one or more system reports comprises one or more of:
correlating one or more absorbed technical documentation sections and one or more unabsorbed technical sections;
determining a frequency of use for one or more features of the software program using the one or more user executed tags; and
determining a frequency of absorption for one or more one or more technical documentation sections using the absorbed technical documentation sections.

7. The method of claim 1, further comprising:
during a user service session for a user of the one or more users, receiving a local documentation framework, a local tag execution tracking log, and local user interaction information from a user management system associated with the user;

generating, using the local tag execution tracking log and the local documentation framework mapping, a user diagnostic report comprising one or more user specific absorbed technical documentation sections and one or more user specific user executed tags in the architecture of the software program; and generating one or more user reports for the software program based on the user diagnostic report.

8. A central management system comprising
one or more processors; and
a memory containing a program which when executed by the processors performs an operation comprising:

generating a central documentation framework mapping one or more technical documentation sections of a software program to one or more tags in an architecture of the software program;

initializing a tag execution tracking log;

providing the software program to one or more users;

marking the central documentation framework with user interaction information received from one or more user management systems associated with the one or more users;

updating the tag execution tracking log with user execution information received from the one or more user management systems associated with one or more users;

generating, using the tag execution tracking log and the central documentation framework, a diagnostic report comprising one or more absorbed technical documentation sections and one or more user executed tags in the architecture of the software program, wherein the one or more absorbed technical documentation sections comprise read technical documentation sections with which the one or more users have read determined by at least eye tracking methods tracking eyes of the one or more users to determine the read technical documentation sections; and generating one or more system reports identifying at least a user utilization frequency of one or more software program features based on the diagnostic report and comprising one or more system development directives for altering the software program based on the diagnostic report and the user utilization frequency.

9. The central management system claim 8, wherein the one or more tags comprise one or more of:
one or more tags at procedure level in the architecture of the software program; and
one or more tags at an object level in the architecture of the software program; and
wherein, the one or more tags comprise tags based on one or more of:
tags generated using keywords in a tracing output in the architecture of the software program; and
tags generated using keywords in comments in the architecture of the software program.

10. The central management system claim 8, wherein central documentation framework mapping further comprises a mapping of one or more of:
licensing information for the software program;
billing information for the software program; and
business directive information for the software program.

11. The central management system claim 8, wherein the user interaction information comprises one or more of:
a user download indication;
a user registration indication;
a user access indication; and
a user absorption indication; and
wherein the user execution information comprises:
an indication of one or more tags executed by the one or more users.

12. The central management system claim 8, further comprising:
marking the tag execution tracking log with one or more external absorption sections received from one or more external absorption sources, wherein the one or more external absorption sources comprise:
customer support tracking logs; and
social resource tracking logs.

13. The central management system claim 12, wherein generating one or more system reports comprises one or more of:
correlating one or more absorbed technical documentation sections and one or more unabsorbed technical sections;
determining a frequency of use for one or more features of the software program using the one or more user executed tags; and
determining a frequency of absorption for one or more one or more technical documentation sections using the absorbed technical documentation sections.

14. The central management system claim 8, further comprising:
during a user service session for a user of the one or more users, receiving a local documentation framework, a local tag execution tracking log, and local user interaction information from a user management system associated with the user;

generating, using the local tag execution tracking log and the local documentation framework mapping, a user diagnostic report comprising one or more user specific absorbed technical documentation sections and one or more user specific user executed tags in the architecture of the software program; and generating one or more user reports for the software program based on the user diagnostic report.

15. A user management system for one or more users comprising:
one or more processors; and
a memory containing a program which when executed by the processors performs an operation comprising:

receiving a local documentation framework mapping one or more technical documentation sections of a software program to one or more tags in an architecture of the software program from a central management system;

initializing a local tag execution tracking log;

during execution of the software program by one or more local users:
updating the local tag execution tracking log with an indication of one or more tags executed by the one or more local users;
generating local user interaction information based on actions of the one or more local users;
marking the local documentation framework with local user interaction and one or more absorbed technical documentation sections, wherein the one or more absorbed technical documentation sections with which the local user has read determined by at least eye tracking methods tracking eyes of the one or more users to determine the read technical documentation sections; and providing the local tag execution tracking log, the local user interaction information, and the local documentation framework to the central management system for identification of at least a user utilization frequency of one or more software program features of the software program.

16. The user management system of claim 15, wherein the one or more tags comprise one or more of:

one or more tags at procedure level in the architecture of the software program; and one or more tags at an object level in the architecture of the software program; and wherein, the one or more tags comprise tags based on one or more of:

tags generated using keywords in a tracing output in the architecture of the software program; and tags generated using keywords in comments in the architecture of the software program.

17. The user management system of claim 15, wherein local documentation framework mapping further comprises a mapping of one or more of:

licensing information for the software program;

billing information for the software program; and business directive information for the software program.

18. The user management system of claim 15, wherein the actions of the one or more local users comprises one or more of:

a user download of the software program;

a user registration with the user management system;

a user access of one or more sections of one or more technical documentation sections; and a user absorption of one or more technical documentation sections.

19. The user management system of claim 18, wherein the user absorption of the one or more technical documentation sections comprises one or more of:

a user reading the one or more technical documentation sections as determined by a visual system associated with the user management system;

a user marking the one or more technical documentation sections as absorbed; and a user interacting with the one or more technical documentation sections.

20. The user management system of claim 18, wherein the operation further comprises:

during a user service session for a user of the one or more users, receiving a request for the local documentation framework, the local tag execution tracking log, and the local user interaction information from the central management system in response to the request, updating the local tag execution tracking log, the local user interaction information, and the local documentation framework; and providing the updated local tag execution tracking log, the updated local user interaction information, and the updated local documentation framework to the central management system.

\* \* \* \* \*